J. M. ST. JOHN.
PIPE COUPLING.
APPLICATION FILED JUNE 9, 1906.
909,830.
Patented Jan. 12, 1909.
Fig. 1.
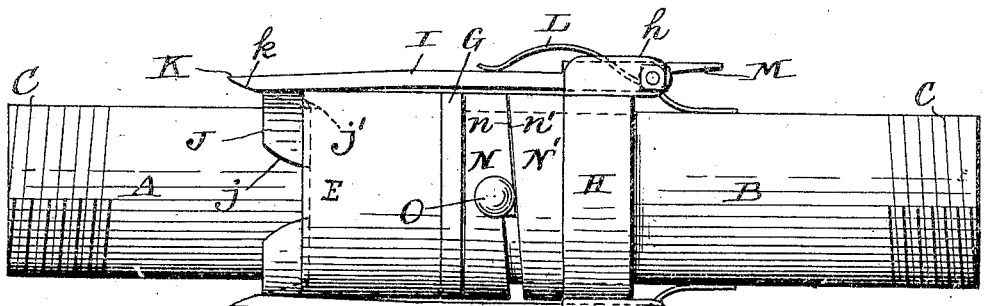
Fig. 2.
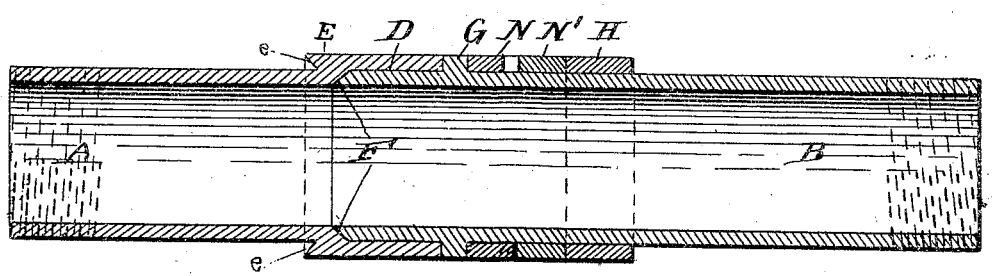
Fig. 3.
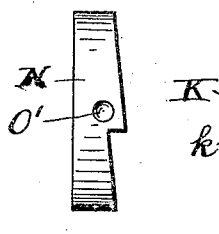
Fig. 4.
Witnesses
Inventor
Joseph M. St John
By
Attorney

UNITED STATES PATENT OFFICE.

JOSEPH M. ST. JOHN, OF PADUCAH, KENTUCKY, ASSIGNOR TO WM. P. MIEDREICH, OF EVANSVILLE, INDIANA.

PIPE-COUPLING.

No. 909,830.   Specification of Letters Patent.   Patented Jan. 12, 1909.

Application filed June 9, 1908. Serial No. 330,998.

*To all whom it may concern:*

Be it known that I, JOSEPH M. ST. JOHN, a citizen of the United States, residing at Paducah, in the county of McCracken and State of Kentucky, have invented certain new and useful Improvements in Pipe-Couplings, of which the following is a specification.

My invention relates to couplings for pipe lines and especially to couplings used for fire hose, air-brake pipe lines and other cases where a quick coupling is to be made, and has for its object the provision of a coupling that is easily and quickly made and broken and very effective in operation.

My improved coupling will be described in detail hereinafter and illustrated in the accompanying drawings in which—

Figure 1 is a side view in elevation of my improved coupling, Fig. 2, a longitudinal sectional view, Fig. 3, a detail view of one of the cam locking rings also illustrating a modification of the means for actuating it, and Fig. 4, a detail view of one of the clamp levers.

In the drawings similar reference characters indicate corresponding parts throughout the several views.

A and B represent short lengths of pipe which are adapted to be secured to the ends of hose or other pipes, or may be the ends of metal pipes, in the latter case the threads C on one end thereof are omitted. The end of pipe A farthest from the threads C is formed larger in diameter than the balance of the pipe, the result being a socket D therein larger in diameter than the bore of the pipe and an annular shoulder E having its surface beveled inwardly. The end of pipe B farthest from the threads C is formed to fit snugly the socket D in the end of pipe A as shown at F and is provided with a circumferential projection or shoulder G to engage the end of pipe A.

H represents a ring slidably mounted on pipe section B having ears h thereon, between each pair of which is pivotally secured a clamp lever I having segmental clamping jaws J with beveled guide surfaces j and beveled clamping surfaces j' to engage the beveled surface e of shoulder E. The ends of clamp levers I are extended beyond the clamping jaws J to form guides K having their inner surfaces beveled as shown at k.

L represents springs to hold the levers I in a clamping position, while M represents finger holds extending from said levers for opening them in breaking the coupling.

N and N' represent rings having corresponding cam faces n and n' respectively. In assembling the coupling the ring N' is secured to ring H while ring N is mounted for rotation between said ring N and shoulder G. In Figs. 1 and 2 O represents a handle for rotating ring N but, as shown in Fig. 3, this may be dispensed with, if desired, and a socket or sockets O' substituted to receive a key (not shown) for turning it.

It will be understood that in making or assembling the coupling the end F of pipe B is inserted in socket D, the beveled surfaces h and j of the clamping jaws J serving to open them to permit the passage of the shoulder E while the springs L close said jaws so as to engage the shoulder E. After being assembled as stated, by rotating the ring N the ring H will be moved back from ring D so as to draw the beveled surfaces j' of jaws J into engagement with the beveled surface e of shoulder E and the coupling will be securely made. In breaking the coupling the ring N is first rotated in a reverse direction so as to relieve the tension on jaws J. Then by pressing on finger holds M the jaws J are thrown outwardly and from engagement with shoulder E and the pipes A and B may be separated.

Having thus described my invention what I claim is—

1. In a pipe coupling two mating pipe sections, one of said sections having a beveled shoulder projecting therefrom, a shoulder on the other section, a ring slidably mounted on the last mentioned section having perforated ears, levers fulcrumed on said ears, segmental clamping members extending laterally from said levers and having beveled surfaces to engage the beveled shoulder aforesaid, springs secured to the ears on the ring and engaging the levers, a cam-faced ring secured to said slidable ring, and a cam-faced ring revolubly mounted on the pipe section and engaging the cam-faced ring and shoulder aforesaid, said cam-faced rings operating to lock the clamping jaws in engagement with said shoulder, substantially as shown and described.

2. A pipe coupling comprising two mating pipe sections, one of said sections having a socket therein, the other section formed to fit said socket snugly, a beveled shoulder on the first mentioned section, a shoulder on the other section, a ring slidably mounted on the last mentioned section having perforated ears, levers fulcrumed on said ears, segmental clamping members extending laterally from said levers and having beveled surfaces to engage the beveled shoulder aforesaid, springs secured to the ears on the ring and engaging the levers, the ends of the levers and of the clamping members beveled inwardly to act as guides for the ends of the levers, a cam-faced ring secured to said slidable ring, and a cam-faced ring revolubly mounted on the pipe section and engaging the cam-faced ring and shoulder aforesaid, said cam-faced rings operating to lock the clamping jaws in engagement with said shoulder, substantially as shown and described.

In testimony whereof I hereto affix my signature in the presence of two witnesses.

JOSEPH M. ST. JOHN.

Witnesses:
W M. E. Ross,
M. M. Weigert.